US011068951B2

(12) United States Patent
Bluestone et al.

(10) Patent No.: US 11,068,951 B2
(45) Date of Patent: Jul. 20, 2021

(54) SYSTEM AND METHOD FOR INITIATING GROUP PURCHASES VIA NETWORK

(71) Applicant: PAYPAL, INC., San Jose, CA (US)

(72) Inventors: Deborah Bluestone, Los Gatos, CA (US); Saloni Pujara, San Jose, CA (US); Brielle Harrison, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 128 days.

(21) Appl. No.: 16/451,234

(22) Filed: Jun. 25, 2019

(65) Prior Publication Data

US 2020/0410571 A1  Dec. 31, 2020

(51) Int. Cl.
*G06Q 30/06* (2012.01)
*G06Q 30/02* (2012.01)

(52) U.S. Cl.
CPC ..... *G06Q 30/0605* (2013.01); *G06Q 30/0251* (2013.01); *G06Q 30/0253* (2013.01); *G06Q 30/0255* (2013.01); *G06Q 30/0633* (2013.01); *G06Q 30/0635* (2013.01); *G06Q 30/0641* (2013.01); *G06Q 30/0643* (2013.01)

(58) Field of Classification Search
None
See application file for complete search history.

(56) References Cited

U.S. PATENT DOCUMENTS

| | | | | |
|---|---|---|---|---|
| 6,269,343 | B1 * | 7/2001 | Pallakoff | G06Q 30/02 |
| | | | | 705/26.2 |
| 9,021,370 | B1 * | 4/2015 | Carlson | G06Q 30/0607 |
| | | | | 715/753 |
| 10,482,487 | B1 * | 11/2019 | Zheleva | G06Q 50/01 |
| 10,825,022 | B1 * | 11/2020 | Kalaboukis | G06Q 30/02 |
| 2003/0225679 | A1 | 12/2003 | Tenorio | |
| 2011/0078007 | A1 | 3/2011 | Chou et al. | |

(Continued)

FOREIGN PATENT DOCUMENTS

TW   200849129 A   * 12/2008

OTHER PUBLICATIONS

Wei, Y., et al., "The Power of Many; an Assessment of Managing Internet Group Purchasing," Issue 12.1, pp. 19-43, Long Beach. (Year: 2011).*

(Continued)

*Primary Examiner* — Nicholas D Rosen
(74) *Attorney, Agent, or Firm* — Haynes and Boone, LLP (57) ABSTRACT

In response to detecting that a first selectable element on a webpage or application page of a merchant has been accessed by a user, a computer system stores a visual representation of an item that corresponds to the first selectable element in a first space of the user. In response to detecting a selection of a second selectable element from within the first space, the computer system determines a threshold number of users to associate with the visual representation and creates a post in a network feed that includes the visual representation, wherein a third selectable element is associated with the post, that when selected, causes a user to join or vote for the first visual representation. In response to determining that a number of users that have selected the third selectable element meets the threshold number of users, the computer system initiates a group purchase for the item.

20 Claims, 7 Drawing Sheets

(56) References Cited

U.S. PATENT DOCUMENTS

| | | | | |
|---|---|---|---|---|
| 2013/0185195 A1 | 7/2013 | Hull et al. | | |
| 2015/0025991 A1* | 1/2015 | Shaw | ............ | G06Q 30/0605 |
| | | | | 705/26.2 |
| 2015/0324877 A1* | 11/2015 | Shaw | ............ | G06Q 30/0605 |
| | | | | 705/14.23 |
| 2016/0104221 A1* | 4/2016 | Zakusilo | ............ | G06Q 30/0605 |
| | | | | 705/26.2 |

OTHER PUBLICATIONS

Machine Translation of Huang patent document TW200849129-A, translation performed Dec. 28, 2020. (Year: 2020).*

Derwent English language abstract of Huang document TW200849129-A, (Year: 2008).*

* cited by examiner

VACATION RENTALS

Search Results: BDRM: MIN 2, SQ FT: MIN 1000 sqft $200/night
2BR/2BA, 1000 sqft

123 Blumpfield Court

In the heart of the city, walking distance to Avocado Toast Bakery

Save to Space — 402

Reserve $210/night
2BR/2BA, 1100 sqft

554 Cannon Drive

Close to Restaurants, the Penelope Theater, Gelateria, and more!

Save to Space

Reserve

SYSTEM AND METHOD FOR INITIATING GROUP PURCHASES VIA NETWORK

TECHNICAL FIELD

The present disclosure relates to group purchases, and more particularly to a system and method for initiating group purchases using a network feed.

BACKGROUND

The payments landscape has changed drastically over the past decade. This is primarily due to fintech companies that have allowed consumers to have simple and frictionless shopping experiences online, while also allowing consumers to transfer money to their family and friends via their computers and mobile devices. Furthermore, fintech companies have also provided users with an avenue to send invoices to other users and also to keep track of their transactions. In addition, with the addition of in-app spaces, consumers have been able to add items to an in-app space where they can view the item later, and possibly purchase the item if desired. However, as the digital payments landscape continues to evolve, there remains a need for a system that allows for easy and frictionless group payments.

DETAILED DESCRIPTION

Embodiments of the present disclosure provide a system, method, and program product. In response to detecting that a first selectable element on a webpage or application page of a first merchant has been accessed by a first user, a computer system stores a first visual representation of an item or content that corresponds to the first selectable element in a first space of the first user. In response to detecting a selection of a second selectable element from within the first space, the computer system determines a first threshold number of users to associate with the first visual representation and creates a post in a network feed that includes the first visual representation, wherein a third selectable element is associated with the post, that when selected, causes a user to join or vote for the first visual representation. In response to determining that a number of users that have selected the third selectable element meets or exceeds the first threshold number of users, the computer system initiates a group purchase for the item or content associated with the first visual representation.

In the example embodiment, the present disclosure describes a solution that allows for an item or content that is being viewed by a user to be saved within an in-app space provided by a service provider (also may be accessible via a website of the service provider). Furthermore, the present solution describes a solution in which a user may post the item or content to one or more users of the service providers and further solicit votes or request users to join in on a group purchase of the item or content. The present disclosure also describes providing an interface wherein a user can input a threshold number of users to associate with the item or content, and further may associate an expiration date/time with the item/content or the post. The present disclosure describes creating a post in a network feed of the service provider that includes the item or content and may also include other item or content chosen by the user or suggested to the user by the service provider. In addition, the post may include a "join" or "vote" selectable element that may be associated with the item/content (an element may be associated with each item/content included in the post), which users of the service provider may utilize to join or vote for the associated item/content. Furthermore, the present disclosure describes determining if the threshold number of users associated with the item/content has been met or exceeded (based on the number of users that have joined/voted for the item/content), and based on determining that the threshold number has been met or exceeded, initiating a group purchase of the item/content.

Embodiments of the present disclosure will now be described in detail with reference to the accompanying Figures.

Figure 1:
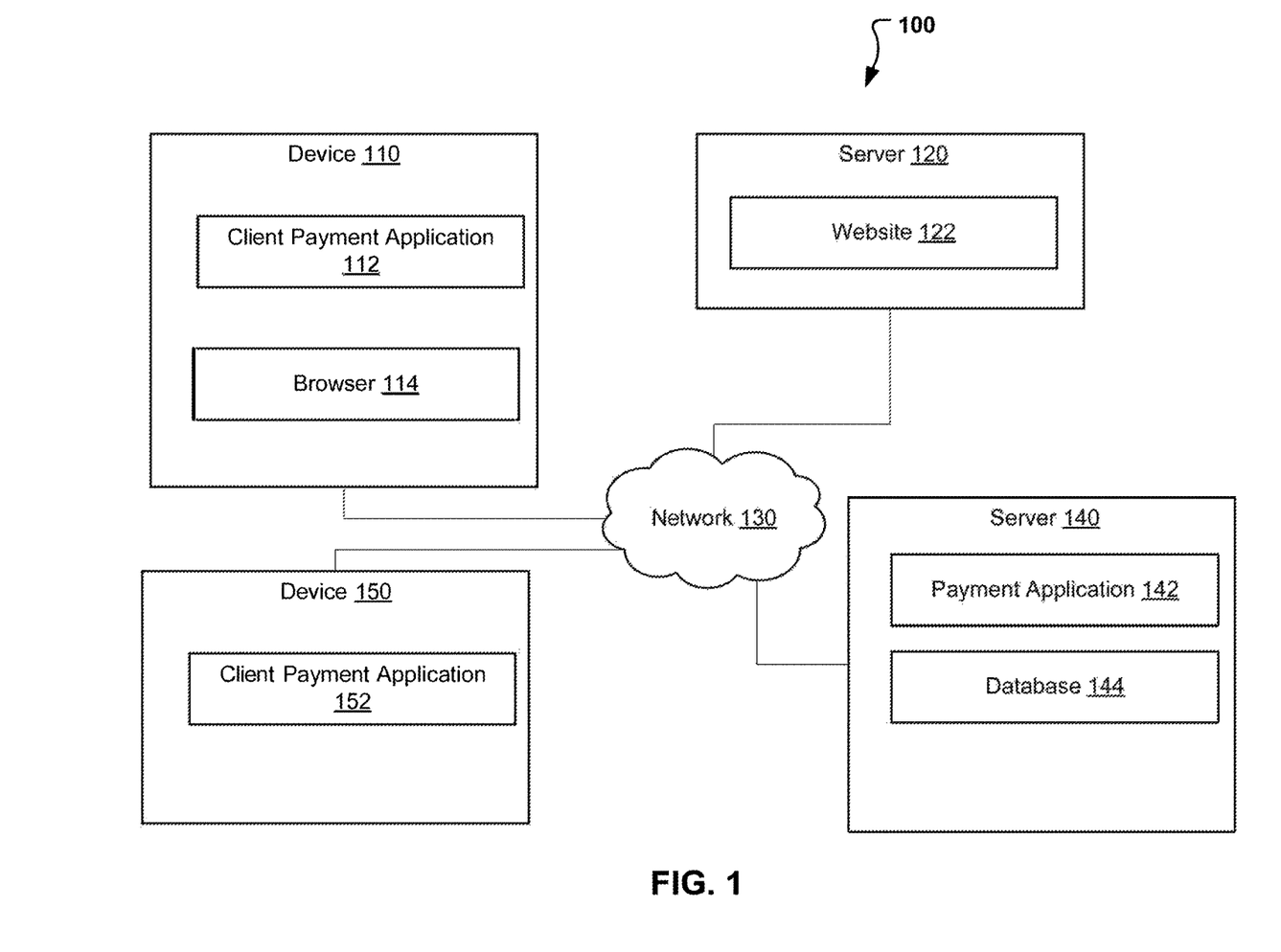
FIG. 1 illustrates a payment system, in accordance with an embodiment.

FIG. 1 illustrates payment system 100, in accordance with an embodiment. In the example embodiment, payment system 100 includes device 110, server 120, server 140, and device 150 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between device 110 and server 140.

In the example embodiment, server 120 includes website 122. In the example embodiment, server 120 is a server of a merchant or a service provider, however, in other embodiments, server 120 may correspond to a different type of entity. In the example embodiment, server 120 may be a desktop computer, a laptop computer, a tablet computer, a mobile device, a handheld device, a thin client, or any other electronic device or computing system capable of receiving and sending data to and from other computing devices, such as device 110, via network 130. Although not shown, optionally, server 120 can comprise a cluster of servers executing the same software to collectively process requests as distributed by a front-end server and a load balancer. In the example embodiment, server 120 is a computing device that is optimized for the support of websites that reside on server 120, such as website 122, and for the support of network requests related to websites, which reside on server 120. Server 120 is described in more detail with regard to the figures.

In the example embodiment, website 122 is a collection of files including, for example, HTML files, CSS files, image files and JavaScript files. Website 122 may also include other resource files such as audio files and video files. In the example embodiment, website 122 is a merchant or service provider website, however, in other embodiments, website 122 may be another type of website. Website 122 is described in more detail with regard to the figures.

In the example embodiment, device 150 includes client payment application 152. In the example embodiment, device 150 may be a desktop computer, a laptop computer, a tablet computer, a mobile device, a handheld device, a thin client, or any other electronic device or computing system capable of receiving and sending data to and from other computing devices, such as server 140, via network 130. Although not shown, optionally, device 150 can comprise a cluster of servers executing the same software to collectively process requests as distributed by a front-end server and a load balancer. Device 150 is described in more detail with regard to the figures.

In the example embodiment, client payment application 152 is a client-side application, corresponding to the server-side payment application 142, that is capable of transmitting requests to payment application 142 and is further capable of providing received information to a user of device 110 via a user interface. Client payment application 152 is described in more detail with regard to the figures.

In the example embodiment, device 110 includes client payment application 112 and browser 114. In the example embodiment, device 110 may be a desktop computer, a laptop computer, a tablet computer, a mobile device, a handheld device, a thin client, or any other electronic device or computing system capable of receiving and sending data to and from other computing devices, such as server 140, via network 130. Device 110 is described in more detail with regard to the figures.

In the example embodiment, client payment application 112 is a client-side application, corresponding to the server-side payment application 142, that is capable of transmitting requests to payment application 142 and is further capable of providing received information to a user of device 110 via a user interface. Client payment application 112 is described in more detail with regard to the figures.

In the example embodiment, browser 114 is an application that is capable of communicating with other computing devices to transmit, request and a receive information. Furthermore, browser 114 is capable of displaying received information to the user of device 110. In the example embodiment, browser 114 may transmit a request to website 122, and further receive webpage information from website 122. Browser 114 is described in further detail with regard to the figures.

In the example embodiment, server 140 includes payment application 142 and database 144. In the example embodiment, server 140 may be a desktop computer, a laptop computer, a tablet computer, a mobile device, a handheld device, a thin client, or any other electronic device or computing system capable of receiving and sending data to and from other computing devices, such as device 110, via network 130. Although not shown, optionally, server 140 can comprise a cluster of servers executing the same software to collectively process requests as distributed by a front-end server and a load balancer. In the example embodiment, server 140 is a computing device that is optimized for the support of applications that reside on server 140, such as payment application 142, and for the support of network requests related to payment application 142. Server 140 is described in more detail with regard to the figures.

In the example embodiment, database 144 is a database that includes information that corresponds to one or more users of the service provider associated with server 140, such as one or more user preferences, user transactional history, items that are saved or have been previously saved to a user space within payment application 142, user transaction habits, user financial information, user authentication information, user preferences, user connections (other users that a user may be linked to, connected with, etc.), and additional user information. Database 144 is described in more detail with regard to the figures.

In the example embodiment, payment application 142 is a server-side application, corresponding to the client-side applications such as client payment application 112. While in the example embodiment, payment application 142 is a payment application, in other embodiments, payment application 142 (and the corresponding client applications) may be a social media application, an e-commerce application, or a different type of application. In the example embodiment, payment application 142 is capable of receiving information from client applications and further capable of responding to requests from corresponding client applications. In addition, in the example embodiment, payment application 142 is capable of detecting if a user, such as the user of device 110, has selected an item to be added to a user space within a user interface provided by payment application 142, and based on the detected, rendering the selected item within the provided user interface. In addition, payment application 142 is capable of detecting if a user interface element has been selected corresponding to the transmission of one or more saved items to a network feed that is viewable by one or more users of payment application 142. In addition, payment application 142 is capable of determining a number of other users that correspond to a transmitted saved item, and further, based on determining that the number of corresponding other users has been met (or exceeded), payment application 142 is capable of initiating a group purchase for the saved item. Furthermore, payment application 142 is capable of analyzing an item saved to a user space of a user, and further capable of suggesting another item to associate with the saved item. Payment application 142 is described in more detail with regard to the figures.

Furthermore, in one or more embodiments, payment application 142 may utilize an application programming interface (API) in communicating with other programs, and further in communicating with database 144.

Figure 2:
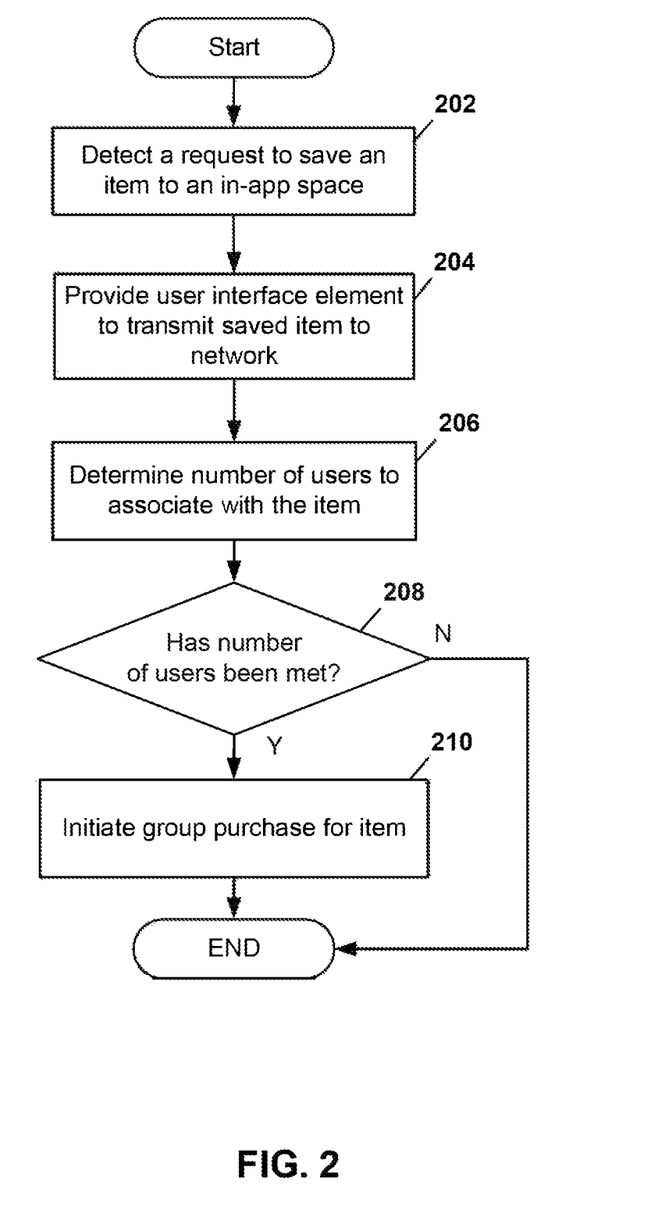
FIG. 2 is a flowchart illustrating the operations of the payment application of FIG. 1 in determining if an item transmitted to a network feed corresponds to an amount of users that exceeds a threshold amount of users, and based on the determination, initiating a group purchase, in accordance with an embodiment.

FIG. 2 is a flowchart illustrating the operations of payment application 142 in determining if an item transmitted to a network feed corresponds to an amount of users that exceeds a threshold amount of users, and based on the determination, initiating a group purchase, in accordance with an embodiment.

In the example embodiment, payment application 142 may detect a request to save an item into a user space of the user of device 110 provided to the user by payment application 142 (step 202). In the example embodiment, payment application 142 may provide one or more merchant or service provider websites, such as website 122, with logic to render a "Save to Space" button next to one or more items or content displayed on the website. In other embodiments, payment application 142 may maintain control over a portion of a merchant website, such as website 122, and cause the "Save to Space" button to be rendered on the merchant website. In the example embodiment, a "Save to Space" button is a button that, when accessed by a user, such as the user of device 110, transmits a request to save the item or content to payment application 142 and, in response to the request, payment application 142 saves the item or content associated with the button to the corresponding user space of the user of device 110, the user space provided by payment application 142. In the example embodiment, after saving the item or content to the user space, the user of device 110 may be able to view and access the item or content by utilizing a client-side payment application, such as client payment application 112.

In the example embodiment, payment application 142 may provide a user interface element in association with the saved item/content, the user interface element corresponding to a transmission of the item/content to a network feed (step 204). In the example embodiment, the user interface/user space provided to the user of device 110 by payment application 142 may contain the item(s) and/or content that the user of device 110 has saved and the item(s) and/or content may further be associated with one or more user interface elements. In the example embodiment, upon an item or content being saved to the user space, payment application 142 may associate a "transmission/share" user interface element that, when accessed by the user of device 110, causes the item or content to be posted into a network feed that may be accessible to one or more groups of users of payment application 142 or all users of payment application 142. For example, upon a "transmission/share" user interface element corresponding to a first item being accessed by the user of device 110, payment application 142 may provide a user interface to the user of device 110 which includes one or more selectable options and allows for the selection of one or more users/user groups, such as the user of device 150, that will be allowed access (able to view) the first item (when transmitted to the network feed). In one or more embodiments, payment application 142 may also provide a "suggest" user interface element that corresponds to one or more suggested users. In other words, payment application 142 may determine one or more suggested users to associate with the transmission of the item or content (allow access to the item or content). In one or more embodiments, payment application 142 may determine the one or more suggested users based on the user connections of the user of device 110, past group transactions corresponding to the user of device 110 (originated by the user of device 110 and also not originated by the user of device 110), past transactions corresponding to the user of device 110 and the user connections of the user of device 110, comparing the interests of the user connections of the user of device 110 (and other users of payment application 142) against the item to be transmitted (and/or information associated with the item to be transmitted), or by utilizing other techniques. For example, if the item to be transmitted corresponds to concert tickets for a specific band, and the user of device 110 and three other connections associated with the user of device 110 (such as "friends/connections" associated with the user) purchased tickets for a previous concert for the specific band, payment application 142 may associate the transmission of the item to be transmitted with the three user connections if the "suggest" user interface element is selected by the user of device 110. In another example, if the item to be transmitted corresponds to concert tickets for a specific band, payment application 142 may determine user connections of the user of device 110 that have purchased concert tickets within a time period of the current day (for example, in the last year), and based on identify 10 user connections, payment application 142 may associate the transmission of the item to be transmitted with the 10 user connections if the "suggest" user interface element is selected by the user of device 110. In other embodiments, payment application 142 may determine the one or more suggested users to associate with the transmission of the item or content based on analyzing the item or content. For example, if based on the analyzing, payment application 142 determines that the item or content corresponds to a high school reunion (based on for example utilizing natural language processing), payment application 142 may determine a subgroup (one or more users) that includes users that attended the same high school as the user of device 110 (which may include users that are connected (digitally linked/friends) to the user of device 10 and users that are not connected to the user of device 110).

In one or more embodiments, payment application 142 may determine the one or more suggested users to associate with the transmission of the item or content based on an associated price. For example, based on attributes of one or more users of payment application 142, payment application 142 may determine that a specific subgroup of users may correspond to a discount or offer for the item or content. Based on determining that the specific subgroup of users corresponds to a specific discount or offer, payment application 142 may suggest the specific subgroup of users to the user of device 110 in association with the item or content to be transmitted. Furthermore, in an additional embodiment, payment application 142 may take a budget associated with the users of payment application 142 into account when determining one or more suggested users. In other words, if a user has exceeded an associated budget or will exceed an associated budget if the user participates in a purchase/group purchase of the item or content associated with the transmission, payment application 142 may remove the user from the one or more suggested users.

In the example embodiment, payment application 142 may and determine a number of users (such as a threshold number of users) to associate with the item/content (step 206). In the example embodiment, along with determining one or more users that correspond to the transmission of the item/content, payment application 142 may determine a threshold number of users to associate with the item/content. In the example embodiment, the user of device 110 may provide the threshold number of users to associate with item via a user input. In other embodiments, payment application 142 may automatically determine a threshold number of users to associate with the item/content based on analyzing information corresponding to the item/content. For example, if the item to be transmitted corresponds to discounted concert tickets and the user of device 110 has included a message in the information to be transmitted that in order to be eligible for the discount, 7 tickets need to be purchased, payment application 142 may utilize OCR or similar techniques to analyze the message, and based on the analysis, determine that the threshold number of users to associate with the item is 7.

In the example embodiment, payment application 142 may post the item/content to a network feed and may allow only one or more groups of users or the network at large to view the post. Furthermore, upon posting of the item/content, payment application 142 may associate one or more other user interface elements with the item/content. For example, a "join" user interface element that allows other users to join in or vote for a purchase of the item/content, and a "share" user interface element that allows other users, such as the user of device 150, to share the item/content with one or more users/user groups.

In the example embodiment, payment application 142 may determine if the number of users that have voted or joined the item/content meets the threshold number of users associated with the item/content (decision 208). In the example embodiment, a user that is able to access the item/content post may join or vote by selecting the appropriate user interface element provided by payment application 142. Payment application 142 may then compare the number of users that have joined/voted for the item/content to the determined threshold number of users to determine if the required number has been met. In other embodiments, payment application 142 may determine if the required number (the threshold number of users associated with the item/content) has been met or exceeded.

If payment application 142 determines the number of users that have joined or voted for the item/content does not meet the threshold number of users associated with the item/content (step 208, "NO" branch), payment application 142 may continue to monitor activity with regard to item(s)/content that have been posted to a network feed.

If payment application 142 determines the number of users that have joined/voted for the item/content meets the threshold number of users associated with the item/content (or in other embodiments meets or exceeds) (step 208, "YES" branch), payment application 142 may initiate a group purchase for the item/content (step 210). In the example embodiment, payment application 142 may determine the users that have joined/voted for the item/content and initiate a group purchase for the item/content that includes the determined users that joined/voted and the user of device 110 (the initiating user). In the example embodiment, payment application 142 may, upon determining that the number of users that have joined/voted for the item/content meets the threshold number of users associated with the item/content, automatically extract funds from each user account in order to pay for the group purchase (without requiring or requesting approval from the users). In other embodiments, payment application 142 may extract funds from a designated money pool that corresponds to the users. In further embodiments, payment application 142 may extract funds from an account associated with the user of device 110 and then created and transmit invoices to the determined user that joined/voted for the content. In these further embodiments, payment application 142 may create a management interface for the user of device 110 so that he/she can keep track of the users that have paid for the group purchase. In one or more embodiments, payment application 142 may provide a notification to the user of device 110 or all associated users which includes an "approval" interface element. Upon receiving approval from all associated users, payment application 142 may proceed with the group purchase as described above.

In additional embodiments, based on determining the number of users that have voted or joined the item/content meets the threshold number of users associated with the item/content (or in other embodiments meets or exceeds), rather than initiating a group purchase, payment application 142 may automatically purchase the item/content for the user of device 110. Therefore, in these additional embodiments, payment application 142 may provide a way for a user to obtain feedback and have other users (such as friends/connections) provide input as to the product to buy, and based on the input, trigger an automatic purchase. In another embodiment, rather than performing an automatic purchase, a notification/approval request may be provided to the user of device 110, and upon receiving approval, the purchase may be conducted. For example, if the user of device 110 is having trouble deciding between two vacation rentals, the items may be posted for other users to vote on and based on the input provided from the other users, a purchase may be made.

In one or more embodiments, there may also be an expiration time/date associated with a posted item/content. For example, a user may input that the item/content will expire in 48 hours, and therefore, if the threshold number of users associated with the item/content has not been met within 48 hours, the post may be removed without a purchase being initiated. In other embodiments, if the number of users that have voted or joined the item/content does not meet the threshold number of users associated with the item/content, but is within a threshold percentage/amount of the number of users associated with the item/content (the required users), payment application 142 may transmit a notification to the user of device 110 and request approval to proceed with the purchase.

While in the example embodiment, a single item/content is associated with a post in a network feed, in other embodiments, multiple items/content may be associated with a post, and therefore, a threshold number of users may be determined to be associated with each item/content of the post. In the example embodiment, the threshold number may be the same, however, in other embodiments, the threshold number may be different. For example, the user of device 110 may desire to post about a vacation rental with the post including 2 vacation rental options and payment application 142 receiving input from the user of device 110 that the threshold number of users to associate with each item is 5. Therefore, payment application 142 may automatically initiate a purchase if number of users that join/vote for either of the vacation rental options meets (or exceeds) 5. Furthermore, in one or more embodiments, the post may include 2 items that are options or 2 items that are mutually exclusive. If the user inputs information that the items included within the post are options, then once one of the items meets the required number of users (i.e., 5 from the example above), payment application 142 will discontinue the ability for users to join/vote for the items within the post. If the items within the post are input as mutually exclusive, payment application 142 will continue to allow users to join/vote even if one of the items within the post meets the required number of users (and therefore, both items may lead to a purchase).

Figure 3:
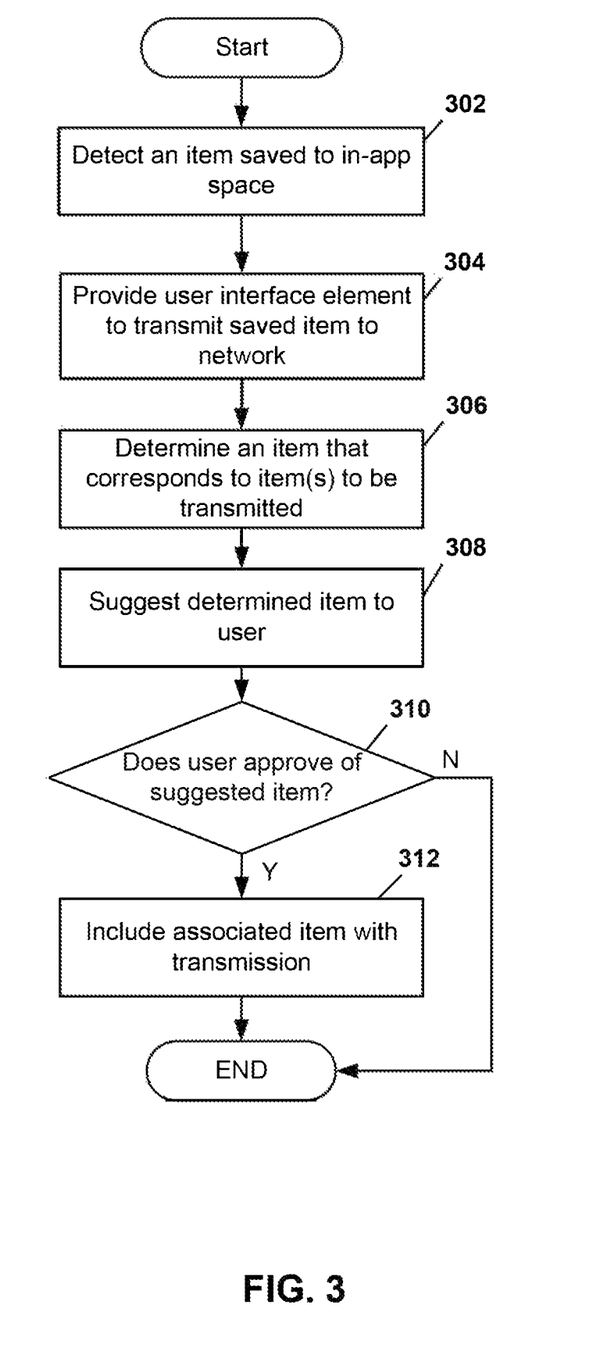
FIG. 3 is a flowchart illustrating the operations of the payment application of FIG. 1 in determining a second item that corresponds to a first item added to a user application space, and further based on user input, associating the second item with the first item within a network transmission, in accordance with an embodiment.

FIG. 3 is a flowchart illustrating the operations of payment application 142 in determining an item that corresponds to one or more items added to a user application space, and further based on user input, associating the item with the one or more items within a network transmission, in accordance with an embodiment.

In the example embodiment, payment application 142 may detect a request to save an item into a user space of the user of device 110 (step 202) and further may provide a user interface element corresponding to the transmission of the item/content to a network feed in the same manner as described above (step 204).

In the example embodiment, payment application 142 may determine an item(s)/content that corresponds to the item(s)/content to be transmitted (step 306). In the example embodiment, payment application 142 may utilize an item based collaborative filtering algorithm to determine an item/content that corresponds to the item(s)/content to be transmitted, however, in other embodiments, other algorithms, such as user based collaborative filtering, search/content based filtering, or other algorithms may be utilized. Furthermore, a similarity algorithm, such as cosine similarity, may be utilized in conjunction with a collaborative filtering algorithm to identify one or more specific item suggestions that correspond to the item(s)/content to be transmitted.

In the example embodiment, payment application 142 may provide the determined item(s)/content that corresponds to the item(s)/content to the user of device 110 as a suggestion for an addition to the transmission in conjunction with the item(s)/content to be transmitted (step 308). In the example embodiment, payment application 142 may provide the suggestion within the application, viewable to the user of device 110 via client payment application 112, prior to transmission of the item(s)/content to the network (the post may only be accessible to certain group or to the entire network as described above).

In the example embodiment, payment application 142 may determine if the user of device 110 has provided an approval to add the suggested item(s)/content to the post to be transmitted (that includes the item(s)/content to be transmitted)(decision 310). In the example embodiment, payment application 142 may provide the suggestion in the form of a notification that includes a selectable element that corresponds to an approval of including the suggested item into the post to be transmitted. Furthermore, the notification may also include a selectable element that corresponds to a denial of the suggested item being included in the transmitted post. Therefore, based on the user feedback, payment application 142 may determine if the user approves or does not approve the inclusion of the suggested item into the post to be transmitted.

If payment application 142 determines that the user of device 110 does not approve the inclusion of the suggested item into the post to be transmitted (decision 310, "NO" branch), payment application 142 proceeds with posting the item(s)/content to be transmitted to the appropriate portion of the network (without including the suggested item).

If payment application 142 determines that the user of device 110 does approve the inclusion of the suggested item into the post to be transmitted (decision 310, "YES" branch), payment application 142 proceeds with posting the suggested item along with the item(s)/content to be transmitted to the appropriate portion of the network (step 312). In the example embodiment, the post may be associated with some or all of the user interface elements and features as described above.

Figure 4:
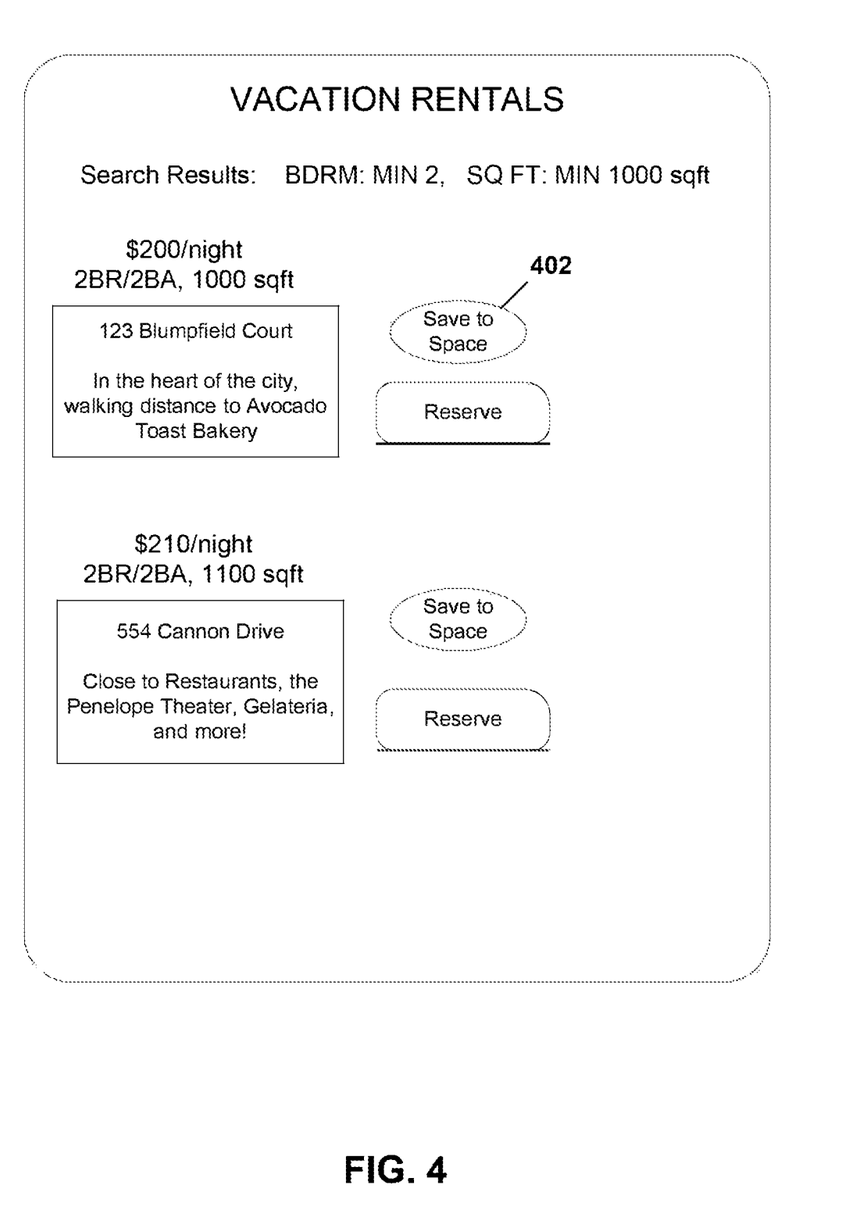
FIG. 4 is a depiction of a user interface of an item listing on a merchant website, in accordance with an embodiment.

FIG. 4 is a depiction of a user interface of an item listing on a merchant website, in accordance with an embodiment. In the example embodiment, FIG. 4 depicts a listing of vacation rentals on a merchant website, and further includes element 402. In the example embodiment, element 402 is a selectable element that corresponds to a saving an item, such as the listing corresponding to the "123 Blumpfield Court" property within a user space provided by payment application 142. Therefore, if the user of device 110 selects element 402, the listing for "123 Blumpfield Court" will be saved by payment application 142 in a designated user space provided by payment application 142. In the example embodiment, as described above, logic may be provided to the merchant to create element 402, or in other embodiments, payment application 142 may maintain control of the portion of the website corresponding to element 402.

Figure 5:
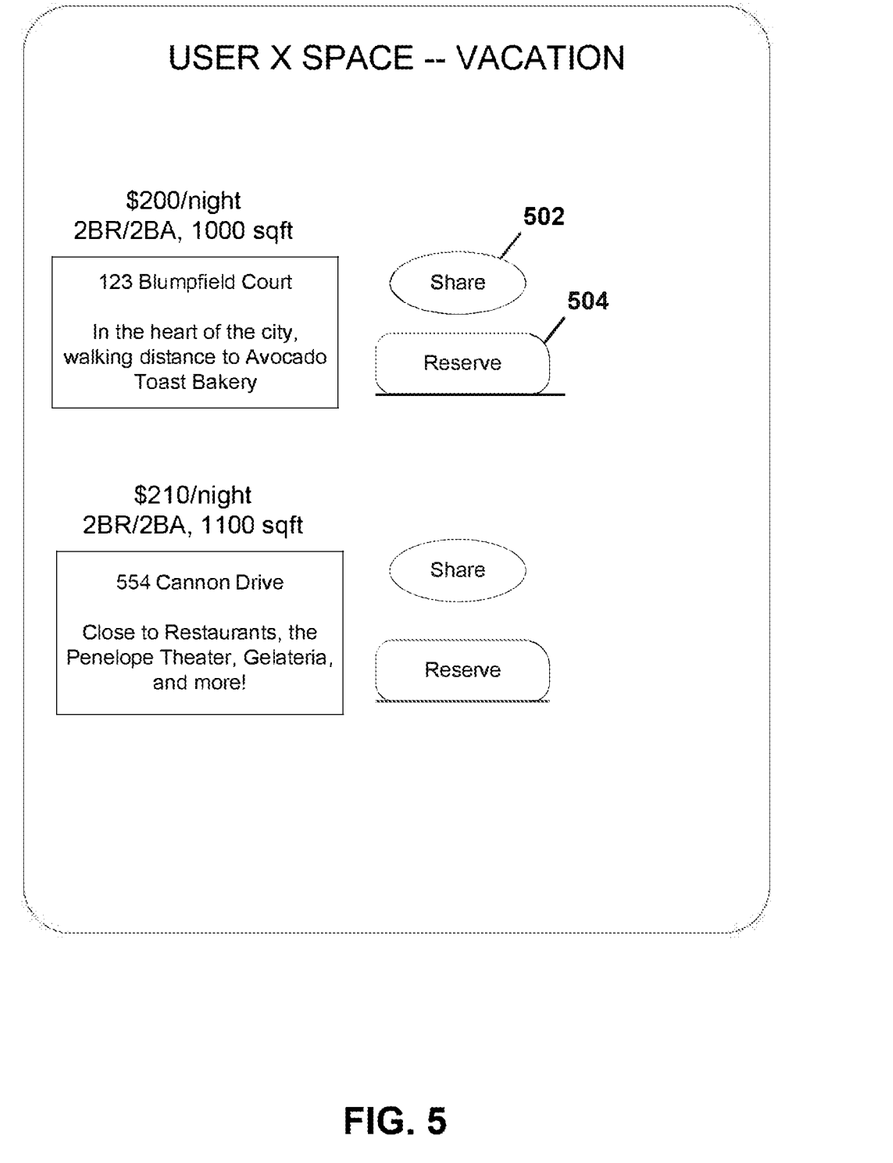
FIG. 5 is a depiction of an in-application user space the includes items that have been saved to the user space by a user, in accordance with an embodiment.

FIG. 5 is a depiction of an in-application user space the includes items that have been saved to the user space by a user, in accordance with an embodiment. In the example embodiment, FIG. 5 depicts an in-application space provided by payment application 142 to the user of device 110, which may be viewable/accessible via client payment application 112. In the example embodiment, after the user of device 110 selects element 402 (the save to space element), payment application 142 may save the corresponding item within the depicted in-application space. In the example embodiment, FIG. 5 includes element 502, which corresponds to a "transmission" of the item to one or more groups or the entire network of users of payment application 142, and element 504, which corresponds to purchasing the item directly within payment application 142 or by way of being re-directed to the corresponding merchant website. As stated above, if the user of device 110 selects element 502, the item may be transmitted along or along with other selected items to a network feed accessible by one or more groups or the entire network of users of payment application 142 at large. As described above, upon the user of device 110 selecting element 502, payment application 142 may provide a user interface that allows the user of device 110 to select the users that will be provided access to the post (transmission).

Figure 6:
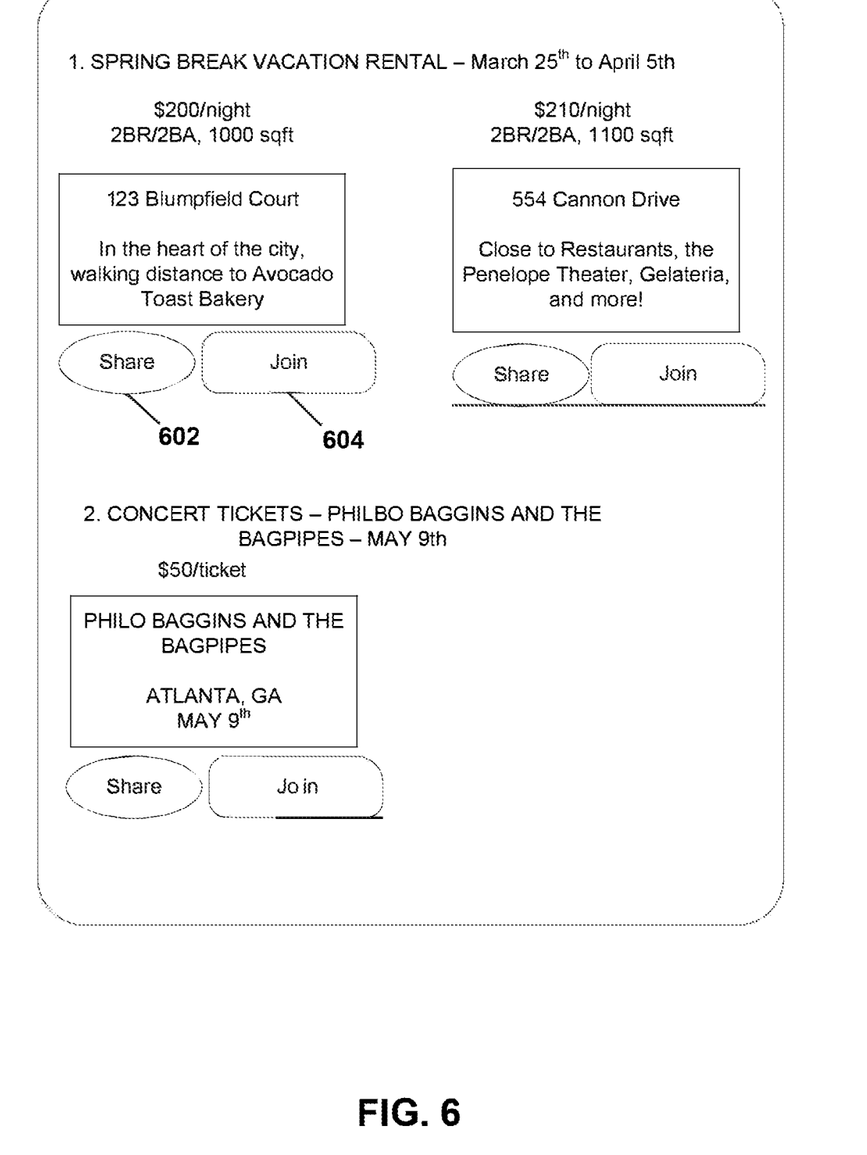
FIG. 6 is a depiction of a network feed within an application that includes items that have been transmitted by a user, in accordance with an embodiment.

FIG. 6 is a depiction of a network feed within an application that includes items that have been transmitted by a user, in accordance with an embodiment. In the example embodiment, FIG. 6 includes depicts a network feed that includes items posted by the user of device 110 and may also include posts by other user of payment application 142. In the example embodiment, FIG. 6 also depicts element 602 and element 604 that are associated with the items posted by the user of device 110. If a user, such as the user of device 150, selects element 602, payment application 142 allows the user of device 150 to share the item with one or more other users of payment application 142. In the example embodiment, if a user, such as the user of device 150, selects element 604, the user of device 150 joins or votes for the item. For example, FIG. 6 depicts two options for a vacation rental for the time period of March $25^{th}$ to April $25^{th}$. The user of device 110 may input a group of users to transmit the post to and further a number of associated users for a purchase (group purchase) to be initiated, as described above. In the example embodiment, a user within the designated group of users may have the option to join/vote for one of the two options presented, and if one of the options collects enough votes to reach the designated number of associated users, payment application 142 may remove the ability for users to join or vote for the options, and further may initiate a group purchase for selected option in the manner described above.

In addition, in one or more embodiments, payment application 142 may provide the ability for users to comment or like/dislike each of the items or posts that comprise their accessible network feed. Furthermore, when a user joins or votes for an option, an indication may be created to show that the specific user has joined/voted for a specific option, however in other embodiments, the identity of the users may be kept confidential.

Furthermore, in one or more embodiments, while the Figures above depict the user space being provided within an application, in one or more embodiments, payment application 142 may instead provide the user space within a website or make the user space accessible via an application and via a website. Furthermore, while the Figures depict an item or content displayed on a merchant/service provider website being saved in a user space, in other embodiments, an item/content displayed within a merchant/service provider application may be saved in a user space provided by payment application 142.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Furthermore, this specification includes references to "the example embodiment," "other embodiments," "one or more embodiments, "further embodiments", "additional embodiments", and the like. The appearances of these phrases do not necessarily refer to the same embodiment. Particular features, structures, or characteristics may be combined in any suitable manner consistent with this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features.

Figure 7:
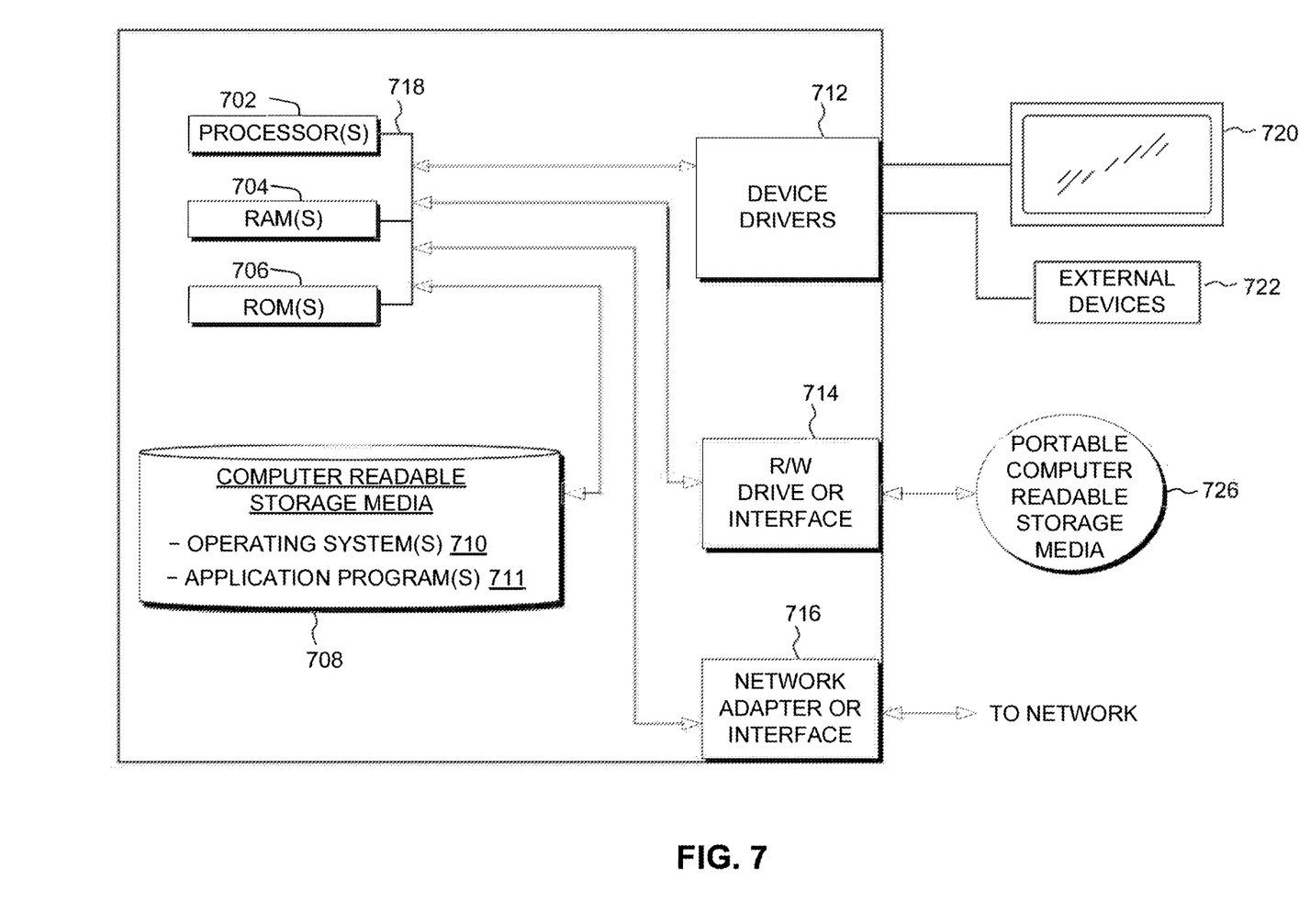
FIG. 7 is a block diagram depicting the hardware components of the payment system of FIG. 1, in accordance with an embodiment.

FIG. 7 depicts a block diagram of components of computing devices contained in payment system 100 of FIG. 1, in accordance with an embodiment. It should be appreciated that FIG. 7 provides only an illustration of one implementation and does not imply any limitations with regard to the environments in which different embodiments may be implemented. Many modifications to the depicted environment may be made.

Computing devices may include one or more processors 702, one or more computer-readable RAMs 704, one or more computer-readable ROMs 706, one or more computer readable storage media 708, device drivers 712, read/write drive or interface 714, network adapter or interface 716, all interconnected over a communications fabric 718. Communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711, for example, payment application 142, are stored on one or more of the computer readable storage media 708 for execution by one or more of the processors 702 and by utilizing one or more of the respective RAMs 704 (which typically include cache memory). In the illustrated embodiment, each of the computer readable storage media 708 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 714 to read from and write to one or more portable computer readable storage media 726. Application programs 711 on the computing devices may be stored on one or more of the portable computer readable storage media 726, read via the respective R/W drive or interface 714 and loaded into the respective computer readable storage media 708.

Computing devices may also include a network adapter or interface 716, such as a TCP/IP adapter card or wireless communication adapter (such as a 4G wireless communication adapter using OFDMA technology). Application programs 711 on the computing devices may be downloaded to the computing devices from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

Computing devices may also include a display screen 720, and external devices 722, which may include, for example a keyboard, a computer mouse and/or touchpad. Device drivers 712 interface to display screen 720 for imaging, to external devices 722, and/or to display screen 720 for pressure sensing of alphanumeric character entry and user selections. The device drivers 712, R/W drive or interface 714 and network adapter or interface 716 may comprise hardware and software (stored on computer readable storage media 708 and/or ROM 706).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
   one or more computer-readable memories storing program instructions; and
   one or more processors configured to execute the program instructions to cause the system to perform operations comprising:
      in response to detecting that a first selectable element on a webpage or application page of a first merchant has been accessed by a first user, storing a first visual representation of an item or content that corresponds to the first selectable element in association with a first space that corresponds to the first user, the first space provided within a website or application that corresponds to a first entity that is different than the first merchant;
      in response to the first user accessing the first space, displaying the first visual representation within the first space, wherein the first visual representation includes a second selectable element;
      in response to detecting a selection of the second selectable element by the first user, determining a first threshold number of users to associate with the first visual representation and creating a post in a network feed that includes the first visual representation, wherein a third selectable element is associated in the post with the first visual representation, the third selectable element when selected, causing a user to join or vote for the first visual representation; and
      in response to determining that a number of users that have selected the third selectable element meets or exceeds the first threshold number of users, initiating a group purchase for the item or content associated with the first visual representation.

2. The computer system of claim 1, wherein the network feed is accessible by one or more users of the first entity.

3. The computer system of claim 1, the operations further comprising:
  making the post inaccessible to one or more users of the first entity based on user input.

4. The computer system of claim 1, wherein the post includes a second visual representation corresponding to another item or content, and wherein the second visual representation is associated with a second threshold number of users and a fourth selectable element, the fourth selectable element, when selected, causes a user to join or vote for the second visual representation.

5. The computer system of claim 4, the operations further comprising:
  determining that a number of users that have selected the fourth selectable element does not meet or exceed the second threshold number of users.

6. The computer system of claim 4, wherein the second threshold number of users is the same as the first threshold number of users.

7. The computer system of claim 1, wherein the initiating the group purchase for the item or content associated with the first visual representation includes automatically processing the group purchase for the item or content without requiring approval from the first user or one or more other users that selected the third selectable element.

8. A non-transitory computer-readable medium storing computer-executable instructions, that in response to execution by one or more hardware processors, cause the one or more hardware processors to perform operations comprising:
  in response to detecting that a first selectable element on a webpage or an application page of a first merchant has been accessed by a first user, storing a first visual representation of an item or content that corresponds to the first selectable element in association with a first space that corresponds to the first user, the first space provided within a website or application that corresponds to a first entity that is different than the first merchant;
  in response to the first user accessing the first space, displaying the first visual representation within the first space, wherein the first visual representation includes a second selectable element;
  in response to detecting a selection of the second selectable element by the first user, determining a first threshold number of users to associate with the first visual representation and creating a post in a network feed that includes the first visual representation, wherein a third selectable element is associated in the post with the first visual representation, the third selectable element when selected, causing a user to join or vote for the first visual representation; and
  in response to determining that a number of users that have selected the third selectable element meets or exceeds the first threshold number of users, initiating a purchase for the item or content associated with the first visual representation.

9. The non-transitory computer-readable medium of claim 8, wherein the initiating the purchase for the item or content associated with the first visual representation includes automatically processing the purchase for the item or content without requiring approval from the first user.

10. The non-transitory computer-readable medium of claim 8, wherein the purchase is a group purchase.

11. The non-transitory computer-readable medium of claim 10, wherein the initiating the purchase for the item or content associated with the first visual representation includes:
  extracting funds from an account associated with the first user to make the purchase; and
  transmitting one or more invoices to one or more other users that selected the third selectable element.

12. The non-transitory computer-readable medium of claim 8, the operations further comprising:
  making the post inaccessible to one or more users of the first entity based on user input.

13. The non-transitory computer-readable medium of claim 8, wherein the post includes a second visual representation corresponding to another item or content, and wherein the second visual representation is associated with the first threshold number of users and a fourth selectable element, the fourth selectable element, when selected, causes a user to join or vote for the second visual representation.

14. The non-transitory computer-readable medium of claim 13, the operations further comprising:
  determining that a number of users that have selected the fourth selectable element does not meet or exceed the first threshold number of users.

15. A method, comprising:
  in response to detecting that a first selectable element on a webpage or an application page of a first merchant has been accessed by a first user, storing, by a computing system, a first visual representation of an item or content that corresponds to the first selectable element in association with a first space that corresponds to the first user, the first space provided within a website or application that corresponds to a first entity that is different than the first merchant;
  in response to the first user accessing the first space, displaying, by the computing system, the first visual representation within the first space, wherein the first visual representation includes a second selectable element;
  in response to detecting a selection of the second selectable element by the first user, determining, by the computing system, a first threshold number of users to associate with the first visual representation and creating a post in a network feed that includes the first visual representation, wherein the post is accessible to a subset of users of the network, and wherein a third selectable element is associated in the post with a third selectable element, the third selectable element when selected, causing a user to join or vote for the first visual representation; and
  in response to determining that a number of users that have selected the third selectable element meets or exceeds the first threshold number of users, initiating, by the computing system, a group purchase for the item or content associated with the first visual representation.

16. The method of claim 15, wherein the subset of users of the network that have access to the post is determined based on user input.

17. The method of claim 15, wherein the post includes a second visual representation corresponding to another item or content, and wherein the second visual representation is associated with a second threshold number of users and a fourth selectable element, the fourth selectable element when selected, causes a user to join or vote for the second visual representation.

18. The method of claim 17, further comprising:
  determining that a number of users that have selected the fourth selectable element does not meet or exceed the second threshold number of users.

19. The method of claim 18, wherein the second threshold number of users is the same as the first threshold number of users.

20. The method of claim 17, further comprising:
  determining, by the computing system, that the another item or content associated with the second visual representation corresponds to the item or content associated with the first visual content; and
  providing, by the computer system, a suggestion to include the second visual representation in the post.

\* \* \* \* \*